Nov. 6, 1945.  O. E. WAGENKNECHT  2,388,625
ANTENNA FOR AUTOMOBILES AND OTHER VEHICLES
Filed Dec. 14, 1942
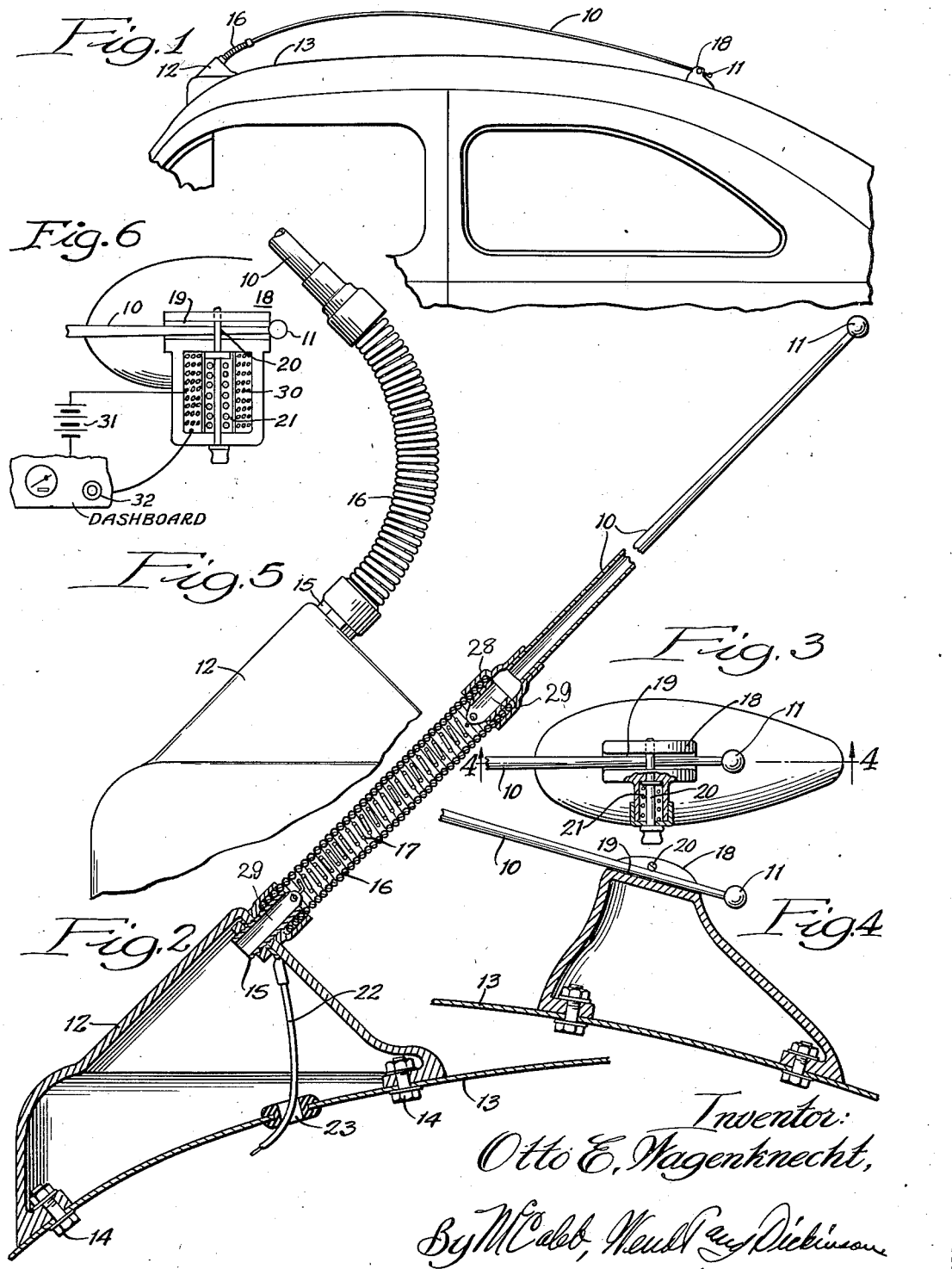
Inventor:
Otto E. Wagenknecht,
By McCaleb, Wendt and Dickinson
Attorneys.

Patented Nov. 6, 1945

2,388,625

UNITED STATES PATENT OFFICE 2,388,625

ANTENNA FOR AUTOMOBILES AND OTHER VEHICLES

Otto E. Wagenknecht, Chicago, Ill., assignor to Zenith Radio Corporation, Chicago, Ill., a corporation of Illinois Application December 14, 1942, Serial No. 468,931

4 Claims. (Cl. 250—33)

This invention relates to antennas for automobiles and other vehicles and has for its principal object to provide a rod antenna which is capable of extending upwardly above an automobile and which can be moved to a stowed but operative position in which the antenna conforms to the general streamlined form of present-day automobiles.

The features of the present invention which are believed to be novel are set forth with particularity in the appended claims. The present invention itself, both as to its organization and manner of operation, together with further objects and advantages thereof may best be understood by reference to the following description taken in connection with accompanying drawing in which:

Fig. 1 is an elevational view of an automobile equipped with an improved antenna, the antenna being shown in full lines in stowed operative position;

Fig. 2 is a sectional detail view showing the manner in which the antenna is mounted on the roof of an automobile, the antenna being in erected position;

Fig. 3 is a plan view of the anchor means for maintaining the free end of the antenna in stowed operative position;

Fig. 4 is a sectional view thereof, the section being taken on the line 4—4 of Fig. 3;

Fig. 5 is a fragmentary view of the lower end of the antenna showing the manner in which the same is flexed by overhead obstructions when the automobile is moved rearwardly thereunder; and Figure 6 is a view, partly in section, of an alternative form of anchor means and associated operating mechanism.

Referring to the drawing, my improved antenna consists essentially of a long flexible metal rod 10, which may suitably be a metal tube which tapers toward its free end. At such end it may suitably be provided with a ball 11.

The antenna may be of any desired length, but it is preferred that its length be such that its free end can be anchored in a position close to the roof of the car as shown in Fig. 1.

The antenna is secured to the automobile roof preferably at a point immediatly above the windshield by means of a base 12 conformed to seat upon the sloping roof. The base 12 may be formed of insulating material or it may be formed of metal, in which case the mounting of the antenna thereon is effected by means of suitable insulating elements. The base 12 may be secured to the roof 13 of the automobile in any suitable manner, for example by means of bolts 14.

A sleeve or ferrule 15 is mounted on the base 12 so that it projects upwardly therefrom in the direction which the rod 10 is intended to have when it is unstowed, this direction being that of the rod 10 in Fig. 2. As shown in that figure, it is preferred that this direction should be upwardly and rearwardly with respect to the horizontal longitudinal direction of the automobile, with an angle of about 45 or 50 degrees to the horizontal. The upward end of the sleeve 15 receives the lower end of a closely wound coil spring 16, the upper end of which is received in a sleeve or ferrule 28, on the lower end of the rod 10, the spring 16 being firmly anchored to the sleeves 15 and 28 in any suitable manner, for example by brazing. The spring 16 is a strong coil spring which normally supports the rod 10 in its erected position, Fig. 2. To enhance the action of the spring I prefer to provide within it a coil spring 17, which is under considerable tension and which has its ends connected to plugs 29 rigidly carried by the sleeves 15 and 28.

The spring 16 and the spring 17 provide for articulation of the rod 10 relative to the base 12 when the rod 10 is moved to its stowed position or when the rod 10 engages an overhead obstruction. Thus, if the rod 10 is in its unstowed position and the automobile is backed out of a garage, the upper end of the rod 10 may engage the lintel of the doorway and be bent forwardly. The spring 16 will be bent into an arc extending forwardly in the manner shown in Fig. 5. The rod 10 is sufficiently flexible so that it will bend into a forwardly extending arc, but the bending is held within practical limits by the considerable flexure of the spring 16. This spring is also flexed when the rod 10 is moved down to its stowed position and rod 10 is also bent to some extent in its stowed position so that it conforms generally to the streamlined form of the roof of the automobile as shown in Fig. 1.

The rod 10 is held in its stowed position by the anchor means 18 shown in detail in Figs. 3 and 4. This anchor means may suitably be in the form of a block of insulating material mounted on the upper part of the automobile and preferably on the roof thereof at a position near the rear end of the automobile. The block 18 is provided with a longitudinal slot 19 adapted to receive the end of the rod 10 in such manner that the ball 11 is located at or near the rear end of the slot. Locking means are provided for holding the rod 10 within the slot 19. This locking means may suitably comprise a bolt 20 slidably mounted in the block 18 and biased by a spring 21 across the slot 19.

It will be readily understood that to effect stowing of the rod 10 it is merely necessary to pull the bolt 20 clear of the slot 19 and to move the rod 10 downwardly so as to position its end within the slot 19. Thereupon the bolt 20 is released and the rod is retained in its bowed position shown in Fig. 1. To erect the rod 10 it is merely necessary to withdraw momentarily the bolt 20 clear of the slot 19.

It is to be noted that if the rod 10 is in its stowed position shown in Fig. 1 and the car is backed up so as to bring the bowed rod 10 into contact with an overhead obstruction, the rod 10 will not be released from the block 18, since the terminal ball 11 normally engages this block and prevents forward movement of the free end of the rod 10.

The sleeve 15 is connected within the base 12 to the insulated lead-in wire 22, which may extend through an opening 23 in the roof of the automobile.

Since the block 18 is made of insulating material, the antenna is in operative condition both when it is stowed and when it is unstowed. It will, of course, be understood that the antenna is more efficient when it is in unstowed or erected condition but it is also highly effective in its stowed or down position. Due to the form of the base 12 and the flexibility of the spring 16 and the flexibility of the rod 10 itself the greater part of the rod 10 in its stowed position is substantially spaced from the roof of the automobile so that the capacity of the rod 10 in relation to the roof is low. Thus the rod 10 serves as an efficient antenna in its stowed position.

It is to be noted in Fig. 1 that my improved antenna, in stowed condition, has a curved forward end which conforms closely to the slope of the windshield. Furthermore, the free end of the rod conforms closely to the trailing surface of the roof. The curved portion of the rod 10 intermediate its ends provides an enhanced tear drop or stream-line appearance to the top surface of the automobile.

My improved antenna enables me to use a relatively long rod 10, and it will appear from Fig. 1 that I may employ a much longer rod by merely locating the anchor block 18 more rearwardly on the upper surface of the automobile.

The bolt 20 may be actuated from a remote position, for example the driver's seat, by suitable means. Thus I provide, as shown in Figure 6, a solenoid 30 adjacent the bolt 20 and arrange the bolt as a magnetic armature. The arrangement is such that the armature 20 is sucked into the solenoid 30 when the latter is energized. Such energization is effected by the battery 31 of the automobile which is connected in circuit through the solenoid 30 and a switch 32 on the dashboard of the automobile.

It should be understood that it is within the scope of the invention to utilize either a single flexible metal rod 10 as the antenna proper, or a slidably jointed rod as the antenna, as is common practice with rod antennas.

Although the invention has been described in connection with the specific details of a preferred embodiment thereof, it must be understood that such details are not intended to be limitative of the invention except in so far as set forth in the accompanying claims.

I claim:

1. The combination with an automobile having a windshield and a roof extending rearwardly from the upper part of said windshield, of an insulating antenna mounting supported on a portion of said roof above the windshield, a flexible rod antenna of a length comparable with the length of said roof, means for resiliently supporting one end of said rod antenna on said mounting, said resilient supporting means being arranged to bias the unsupported end of said flexible rod antenna in a generally upward direction, means for releasably latching the unsupported end of said rod antenna on said roof at a point in the rear of said mounting at a distance less than the length of said rod antenna whereby said rod antenna is held, when its unsupported end is engaged by said latching means, in a bowed position in which capacity between said rod antenna and said roof does not seriously reduce the intensity of signals picked up by said rod antenna, said latching means providing insulation between said rod antenna and said roof whereby signals are not short circuited therebetween, and means carried by and operated from within said automobile for releasing said latch means whereby said antenna may be released to a generally upward position for better signal reception during motion of said automobile.

2. In combination, in an antenna assembly, a mounting supported on a vehicle, a long flexible rod antenna, means for resiliently supporting one end of said antenna upon said mounting, means mounted on such vehicle at a point spaced from said mounting for releasably latching down the unsupported end of said rod antenna, and means carried by and operated from within said vehicle for disengaging said releasable latching means to cause said resilient supporting means to raise said rod antenna in a generally upward direction.

3. The combination with an automobile having a windshield and a roof extending rearwardly from the upper part of said windshield, of an insulating antenna mounting supported on a portion of said roof above the windshield, a flexible rod antenna of a length comparable with the length of said roof, means for resiliently supporting one end of said rod antenna on said mounting, said resilient supporting means being arranged to bias the unsupported end of said flexible rod antenna in a generally upward direction, and said antenna being so constructed and positioned on the automobile as to allow sufficient antenna movement to prevent damage to said antenna when the automobile is driven in either a forward or reverse direction under an obstruction low enough to engage the antenna when it extends in said upward direction, means for releasably latching the unsupported end of said rod antenna on said roof at a point in the rear of said mounting at a distance less than the length of said rod antenna, whereby said rod antenna is held, when its unsupported end is engaged by said latching means, in a bowed position in which capacity between said rod antenna and said roof, does not seriously reduce the intensity of signals picked up by said rod antenna, said latching means providing insulation between said rod antenna and said roof whereby signals are not short-circuited there between, said latching means including a slotted portion disposed longitudinally of the automobile roof, the width of said slotted portion being larger than the diameter of said rod antenna for securing said antenna in slidable engagement within said slotted portion when in its bowed position and within which said antenna is allowed to move relative to said roof enough to allow the bowed portion of the antenna to move closer to the automobile out of harm's way when said automobile is driven in either a forward or reverse direction under an obstruction low enough to engage said bowed portion.

4. The combination with an automobile having a multi-positionable antenna, of an insulating antenna mounting supported on a portion of the automobile roof, a flexible rod antenna of a length comparable with the length of said roof, means for supporting one end of said rod antenna on said mounting, said supporting means supporting the unsupported end of said flexible rod antenna in a generally upward direction, an enlargement on the unsupported end of said antenna, and means for insulatingly retaining said enlargement near said roof against movement away from said roof or towards said mounting means, said retaining means having a slotted portion disposed longitudinally of the automobile roof, the width of said slotted portion being larger than the diameter of said rod antenna, means for securing the antenna in sliding engagement in the slotted portion of said retaining means, said retaining means being positioned on said roof at a distance from said supporting means less than the length of said antenna and great enough such that in its retained position said antenna flexes substantially to normally press said enlargement into engagement with said retaining means by flexing of said antenna, and forming a movable bowed portion thereof whereby said antenna slides through said retaining means and said bowed portion moves closer to said roof out of harm's way when said automobile passes under an obstruction low enough to engage the bowed portion of the antenna to slide said enlargement a substantial distance away from said retaining means.

OTTO E. WAGENKNECHT.